Jan. 2, 1962 L. THOUREL 3,015,819
ELECTROMAGNETIC PULSE TRANSMITTING AND RECEIVING SYSTEMS
Filed Oct. 9, 1957
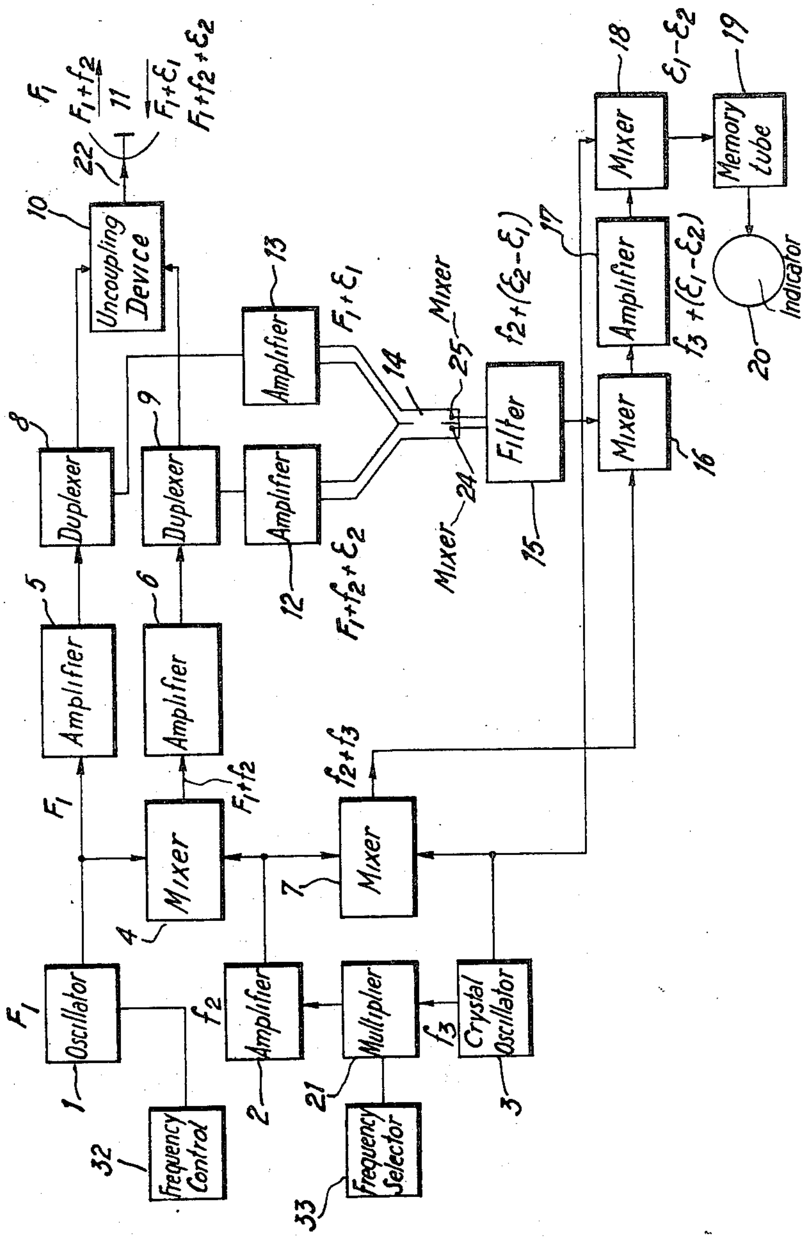

United States Patent Office 3,015,819

Patented Jan. 2, 1962

3,015,819

ELECTROMAGNETIC PULSE TRANSMITTING AND RECEIVING SYSTEMS

Léo Thourel, Paris, France, assignor to Compagnie Generale de Telegraphie Sans Fil, a corporation of France Filed Oct. 9, 1957, Ser. No. 689,224
Claims priority, application France Nov. 2, 1956
6 Claims. (Cl. 343—7.7)

The present invention relates to electromagnetic pulse transmitting and receiving systems.

It is known to improve the performance of such systems by resorting to frequency diversity operation, i.e. by transmitting and receiving the same signals on different close frequencies, by using an erratically varying frequency, in order to minimize systematic jamming, and by eliminating echoes due to stationary objects.

It is an object of this invention to provide an electromagnetic pulse transmitting and receiving system adapted for operating on the diversity frequency principle, and offering particular advantages with respect to protection against jamming. This system is, in addition, capable of operating on an erratic frequency over a very wide frequency range and assures a good elimination of fixed echoes. In a system of the invention, pulses are emitted simultaneously on a first frequency, which may be a random frequency, and on a second frequency, close to the first and, for instance, derived therefrom by mixing therewith a third frequency derived from a crystal controlled frequency.

At the receiver, the two echo signals feed two parallel-connected amplifying chains the respective outputs of which are combined to supply the above third frequency plus the difference between the frequency fluctuations, due to the Doppler effects, of the two transmitted frequencies. Thus the system operates as though its frequency were lower than it is in fact, for instance, a metric frequency, while the advantages inherent to operation with centimetric waves are preserved. A further frequency change provides a signal whose frequency is the difference between the respective frequency fluctuations of the two transmitted frequencies due to the Doppler effect. This signal is used in an indicator, after elimination of the fixed echoes.

The invention will be better understood from the following description taken in conjunction with the appended drawing the single figure of which shows, by way of example only, a block diagram of a system according to the invention.

According to the particular embodiment shown, the transmission is effected as follows: an oscillator 1 equipped with a wide-band tube such as, for example, a "Carcinotron" tube ("Carcinotron" being a registered trademark) radiates pulse signals at a very high frequency $E_1$ which may be caused to vary erratically, for instance, between 2900 and 3000 mc./s. An amplifier 2 supplies a signal having a stable frequency $f_2$, much lower than frequency $F_1$, for instance, 210 mc./s. This signal may be obtained by multiplying by 7, in a multiplier 21, a frequency $f_3$ of 30 mc./s. of a signal supplied by a crystal-driven oscillator 3. A mixer 4 supplies the frequency $(F_1+f_2)$, i.e., in the example considered, a signal having a frequency comprised in the 3110–3210 mc./s. band. The signals having the respective frequencies $F_1$ and $(F_1+f_2)$ drive, respectively, two amplification stages 5 and 6 equipped with travelling wave tubes, for example. These two stages are followed by duplexers 8 and 9 respectively feeding a filtering device 10 which decouples oscillators 1 and 2 and feeds both pulse signals to a guide 22 coupled to a transmitting and receiving aerial 11 radiating these pulses.

Upon reception of the echo, duplexers 8 and 9 respectively feed amplifying stages 12 and 13 equipped, for example, with travelling wave tubes, the output tube operating preferably at saturation in each stage in order to have two output signals of the same level. Owing to the action of device 10, the frequency bands adjacent frequencies $F_1$ and $(F_1+f_2)$ are separated, this filtering being, emphasized by the action of the duplexers 8 and 9. The frequencies of the echoes from moving objects are effected by different fluctuations in the two channels and these fluctuations may be represented by $\epsilon_1$ and $\epsilon_2$, respectively, such that channel 12 amplifies signals having frequencies $(F_1+f_2+\epsilon_2)$, whereas channel 13 amplifies signals having frequencies $(F_1+\epsilon_1)$. It should be noted, incidentally, that amplifying stages 12 and 13 must have a sufficiently wide band-pass and a gain of the order of 50 db which generally would lead to the use of travelling wave tube amplifiers. The last amplifier of each stage should work at saturation, in order that the respective outputs be of the same level. The respective outputs of these tubes are fed to a 3 db hybrid junction 14, the output channels of which comprise crystal mixers 24 and 25 respectively. They feed a filter 15 which supplies the beat frequency $f_2+(\epsilon_2-\epsilon_1)$. An important factor should be stressed: the amplitude of the output signals from this filter is proportional to the product of the amplitudes of the signals of frequencies $(F_1+f_2-\epsilon_2)$ and $(F_1+\epsilon_1)$.

It will be noted that oscillator 2 operates at a frequency which is very close to that of filter 15. Provided sufficient shielding is available, this does not lead to any trouble in actual practice. This is the more so as filter 15 operates at a fixed frequency and at a sufficiently high level, which makes it possible to avoid any interference with its operation from oscillator 2 by providing a correct shielding.

Filter 15 feeds a mixed 16 which is also fed by mixer 7 which mixes the respective outputs of oscillator 3 and amplifier 2 and whose output frequency is $(f_2+f_3)$. In the example shown, this frequency $(f_2+f_3)$ has a value of 240 mc./s.

At the output of mixer 16, a signal of frequency $f_3+(\epsilon_1-\epsilon_2)$, i.e. of about 30 mc./s., is obtained; this signal is amplified by an amplifier 17 before being fed to a mixer 18, where it beats with a signal of frequency $f_3$, i.e. 30 mc./s., collected from oscillator 3. Finally, at the output of mixer 18, a signal is obtained, the frequency of which is the difference $(\epsilon_1-\epsilon_2)$ of the respective fluctuations due to the Doppler effect on the two transmission frequencies $(F_1+f_2)$ and $F_1$. This signal is fed to a memory tube 19 in order to eliminate fixed echoes in accordance with conventional techniques. Tube 19 is followed by a conventional indicator 20.

The system according to the invention provides the following advantages:

(*a*) Diversity frequency operation: there are two transmitted signals at the respective frequencies $F_1$ and $F_1+f_2$, the echoes being mixed in mixers 24 and 25 to provide a single signal at the receiver.

(*b*) Random frequency operation: it is apparent from the foregoing that the operation of the system described requires no stable frequency $F_1$. It is therefore possible to vary purposely and at will this frequency in a random fashion by means of a frequency control 32, the only limitation in this respect being set by the bandwidth of filter 10 and by the value of frequency $f_2$; frequency $f_2$ may also be caused to vary, for example, from 200 to 400 mc./s.

(*c*) Protection against jamming: the advantages of the system described are quite remarkable in this connection. In order that a signal should appear at the output of filter 15, the frequencies in the two channels of junction 14 must differ by $f_2$, which, of course, cannot be achieved with a single frequency-modulated jammer, which transmits only one frequency at a time. Care must be taken, however, that the shock excitation of circuits 12 and 13 in response to the passage of the jammer on their respective natural frequencies should not produce such oscillations that they would overlap in time. To avoid this, it suffices that the response time of these circuits be greater than the time taken by the jammer to cover a frequency band equal to $f_2$. This condition determines the minimum allowable pass-band of circuits 12 and 13. If the band corresponds to 100 mc./s., the shock pulse duration is of the order of one hundredth of a microsecond. For the jamming to be effective, the jammer would have to scan a frequency range equal to $f_2$, i.e. 210 mc./s. in the present case, in less than one hundredth of a microsecond. Such an excursion velocity is, however, impossible to attain according to present day techniques. In addition, in case the jammer would operate simultaneously on two frequencies, spaced by $f_2$, it is easy for the operator to achieve protection by causing the value of $f_2$ to vary by means of a frequency selector 33, for instance, by varying the factor by which frequency $f_3$ is multiplied in multiplier 21.

(*d*) Elimination of echoes from fixed objects: the frequency fluctuations due to the Doppler effect are transferred on frequency $f_2$ which is much lower than $F_1$; the utilization of the frequency difference $\epsilon_1-\epsilon_2$, which considerably reduces on the display screen the clutter hash level due to quasi stationary objects, while increasing the value of the first blind speed which may be brought to about 2000 km./h. The result is to achieve a maximum sharpness of the mobile echoes whose radial speed is in the neighbourhood of 1000 km./h. The quality of the resulting images on the display screen is thus the same as that supplied by a metric radar, but advantage is taken of the high gain of the centimetric wave aerials, while avoiding the use of certain complex devices, such as the high stability local oscillator and the coherent oscillator of conventional radar systems and while benefitting from all the advantages of centimetric systems.

It is to be understood that the invention is in no way limited to the embodiment illustrated which has been given solely by way of example.

What I claim is:

1. A radar system for transmitting signals simultaneously on two close frequencies and receiving the echo thereof for detecting movable targets, comprising: first oscillator means for providing a first signal having a first frequency; second oscillator means for providing a second signal having a second frequency; means for mixing said signals to provide a third signal; an aerial; first and second duplexer means for separately feeding said first and third signals to said aerial; means, respectively coupled to said duplexer means, for mixing the echoes of said first and third signals with each other to provide a fourth signal having the frequency of said second signal plus the difference between the respective Doppler effect frequencies of said first and third signals; and means for deriving from said fourth signal the difference between the respective Doppler components of said first and third signal echoes.

2. A radar system for transmitting signals simultaneously on two close frequencies and receiving the echo thereof for detecting movable targets, comprising: first oscillator means for providing a first signal having a first frequency; second oscillator means for providing a second signal having a second frequency; means for mixing said signals to provide a third signal; an aerial; first and second duplexer means for separately feeding said first and third signals to said aerial; means, respectively coupled to said duplexer means, for mixing the echoes of said first and third signals with each other to provide a fourth signal; means for mixing said second frequency to a predetermined submultiple thereof to provide a fifth signal; means for mixing said fourth and said fifth signals to provide a sixth signal; means for mixing said submultiple frequency signal and said sixth signal to provide a seventh signal, and means for displaying said seventh signal.

3. A radar system for transmitting signals simultaneously on two close frequencies and receiving the echo thereof for detecting movable targets, comprising: first oscillator means for providing a first signal having a first frequency; means for varying said first frequency; second oscillator means for providing a second signal having a second frequency; means for varying said second frequency; means for mixing said signals to provide a third signal; an aerial; first and second duplexer means for separately feeding said first and said third signals to said aerial; means, respectively coupled to said duplexer means, for mixing the echoes of said first and third signals with each other to provide a fourth signal having the frequency of said second signal plus the difference between the respective Doppler effect frequencies of said first and third signals; and means for deriving from said fourth signal frequency the difference between the respective Doppler components of said first and third signal echoes for displaying the resulting signal.

4. A radar system for transmitting signals simultaneously on two close frequencies and receiving the echo thereof for detecting movable targets, comprising: first oscillator means for providing a first signal having a first frequency; second oscillator means for providing a second signal having a second frequency; multiplier means for multiplying said second frequency by a predetermined factor to provide a third signal, having a third frequency; means for mixing said first and third frequencies to provide a fourth signal; an aerial; first and second duplexer means for separately feeding said first and fourth signals to said aerial; means respectively, coupled to said duplexer means, for mixing the echoes of said first and fourth signals with each other to provide a fifth signal having the frequency of said third signal plus the difference between the respective Doppler effect frequencies of said first and fourth signals; means for mixing said second and said third frequencies, to provide a sixth signal; means for mixing said fifth and said sixth signals to provide a seventh signal; means for mixing said seventh and said second signal to provide an eighth signal; and indicator means for displaying said eighth signal.

5. A system according to claim 4 further comprising means for varying said first frequency.

6. A system according to claim 4 further comprising means for varying said second frequency.

References Cited in the file of this patent

UNITED STATES PATENTS

| | | |
|---|---|---|
| 2,543,449 | Enslie | Feb. 27, 1951 |
| 2,658,195 | McConnell | Nov. 3, 1953 |
| 2,883,656 | Russell | Apr. 21, 1959 |